US008316635B2

(12) United States Patent  
Zhang et al.

(10) Patent No.: US 8,316,635 B2
(45) Date of Patent: Nov. 27, 2012

(54) METHODS OF INCREASING ACCURACY OF SOOT LOAD ESTIMATES

(75) Inventors: Yuetao Zhang, Columbus, IN (US); Daniel D. Wilhelm, Nashville, IN (US)

(73) Assignee: Cummins Filtration IP, Inc., Minneapolis, MN (US)

(*) Notice: Subject to any disclaimer, the term of this patent is extended or adjusted under 35 U.S.C. 154(b) by 227 days.

(21) Appl. No.: 12/138,493

(22) Filed: Jun. 13, 2008

(65) Prior Publication Data

US 2009/0308052 A1  Dec. 17, 2009

(51) Int. Cl.
*F01N 3/00* (2006.01)

(52) U.S. Cl. ............... 60/295; 60/274; 60/277; 60/297; 60/311

(58) Field of Classification Search ............ 60/277, 60/295, 311, 274, 297
See application file for complete search history.

(56) References Cited

U.S. PATENT DOCUMENTS

| | | | |
|---|---|---|---|
| 4,471,611 A | 9/1984 | Watanabe | |
| 6,941,750 B2 | 9/2005 | Boretto et al. | |
| 6,973,778 B2* | 12/2005 | Kondou et al. | 60/295 |
| 7,263,825 B1* | 9/2007 | Wills et al. | 60/295 |
| 7,340,887 B2* | 3/2008 | Ante et al. | 60/297 |
| 2004/0134187 A1* | 7/2004 | Inoue et al. | 60/291 |
| 2005/0267670 A1* | 12/2005 | Ante et al. | 701/108 |
| 2007/0234712 A1* | 10/2007 | Ohmura | 60/297 |
| 2008/0078236 A1* | 4/2008 | Mital et al. | 73/38 |

FOREIGN PATENT DOCUMENTS

JP  2007-278206 A  10/2007

OTHER PUBLICATIONS

International Search Report of PCT/US2009/039747 Dated Oct. 28, 2009.
Written Opinion of the International Searching Authority of PCT/US2009/037947, dated Oct. 28, 2009.

* cited by examiner

*Primary Examiner* — Thomas Denion
*Assistant Examiner* — Diem Tran
(74) *Attorney, Agent, or Firm* — Hamre, Schumann, Mueller & Larson, P.C.

(57) ABSTRACT

A method for improving the effectiveness of filters by increasing accuracy of an estimate of particulate matter loading remaining in the filter after cleaning. In one embodiment, the disclosed method includes removing soot from the DPF by cleaning, and measuring parameters for a set of predetermined criteria. The amount of soot present in the DPF is then estimated based on delta pressure. The resulting estimated soot load value accounts for the noise factors such as ash loading after extended operation. The value is then used to adjust for future measurements of soot loading in the DPF after subsequent regeneration treatments and/or used to diagnose the effectiveness of the cleaning. The method can also be applied to diagnostics of the DPF. When discrepancies between DPSLE and model-based soot load estimate are observed in healthy regenerations, failure modes such as plugged filter, extreme ash loading or substrate melting can be detected.

16 Claims, 5 Drawing Sheets

METHODS OF INCREASING ACCURACY OF SOOT LOAD ESTIMATES

FIELD

This disclosure relates generally to methods of accounting for measurement inaccuracies after cleaning a filter, and more particularly to methods of increasing the accuracy of soot load estimates in a particulate filter used for diesel engine exhaust aftertreatment.

BACKGROUND

Aftertreatment devices are well known and widely used in various internal combustion engine applications for the aftertreatment of engine exhaust gases. Such devices as diesel oxidation catalysts (DOC) and diesel particulate filters (DPF) have been useful for handling and/or removing harmful constituents, including carbon monoxide, nitric oxide, unburned hydrocarbons, and soot in the exhaust stream of an engine.

As the DPF collects particulate matter such as soot from the exhaust gas, a back pressure will increase. Unless soot is removed, the accumulation of the soot in the filter can lead to fuel inefficiencies.

In order to remove the soot in the DPF, the DPF is often times regenerated by converting the trapped soot to carbon dioxide in the presence of heat. The healthiness (i.e. the extent of soot removal) of the regeneration process is often determined based on delta pressure based soot load estimates. However, inaccuracies in determining the estimates can lead to failure modes such as uncontrolled regeneration or decreased fuel economy. Thus, there is a need to increase the accuracy of delta pressure based soot load estimates.

SUMMARY

Methods for improving the accuracy of delta pressure based soot load estimates used to gauge the healthiness of a regeneration process on a DPF are described. While the methods described herein have particular use in soot load estimates in regeneration process on a DPF in an exhaust gas aftertreatment system, the methods can be used in other filter technologies where one wishes to measure the healthiness of a cleaning or regeneration process on a filter.

The disclosed methods take certain noise factors into account to improve the accuracy of the estimate. The estimate, which is a value reflective of an amount of particulate matter present in the filter after cleaning rather than being a measure of the actual amount of particulate matter, has improved accuracy and is better able to identify filters that fail to regenerate/clean properly.

In one embodiment, the method involves adjusting a reference value for estimating soot loading in a DPF after cleaning. The method includes removing soot from the DPF by cleaning, and measuring parameters for a set of predetermined criteria. The cleaning is continued until all of the predetermined criteria are achieved. The soot load in the DPF is then estimated based on delta pressure. The resulting estimated soot load value accounts for the noise factors such as ash loading after extended operation. The value is then used to adjust for future estimates of soot loading in the DPF after subsequent cleaning treatments.

In another embodiment, the method involves diagnosing a healthiness of a regeneration by verifying that manufacturer-defined criteria are met. The method includes comparing a DPF inlet temperature with a targeted temperature as well as a DPF inlet volumetric flow rate with a requested flow rate. A DPF is diagnosed to be healthy if an amount of time during regeneration in which the criteria are met is greater than predefined thresholds. The method also involves determining a delta pressure based soot load estimate at the end of the regeneration where predetermined criteria are met, and then verifying that the manufacturer-defined criteria are met by comparing the delta pressure based soot load estimate with a predefined threshold.

DETAILED DESCRIPTION

Methods for improving the accuracy of an estimate of removable particulate matter loading remaining in the filter after a cleaning procedure. The disclosed methods adjust for inaccuracies that may be derived from offsetting factors such as variations in flow resistance between filters. The following description will describe the filter as being a DPF and a material to be filtered as exhaust gas. However, in appropriate circumstances, the concepts described herein can be applied to other types of filters and filtration systems, for example, a water filtration system for filtering water.

In one embodiment, the disclosed method involves estimating soot load in a filter based on delta pressure. In estimating the soot load, a DPF is calibrated before use. The DPF used in the calibration is a fresh part with very little contamination. The calibration commonly involves passing exhaust gas at specific volumetric flow rates through the DPF having very little or no contamination, and then measuring delta pressures. These delta pressure measurements relative to the volumetric flow rates represent a baseline for flow resistance in a clean DPF. The calibration further involves loading the DPF having very little or no contamination with known amounts of soot, passing exhaust gas at specific volumetric flow rates and then measuring delta pressures.

Figure 1:
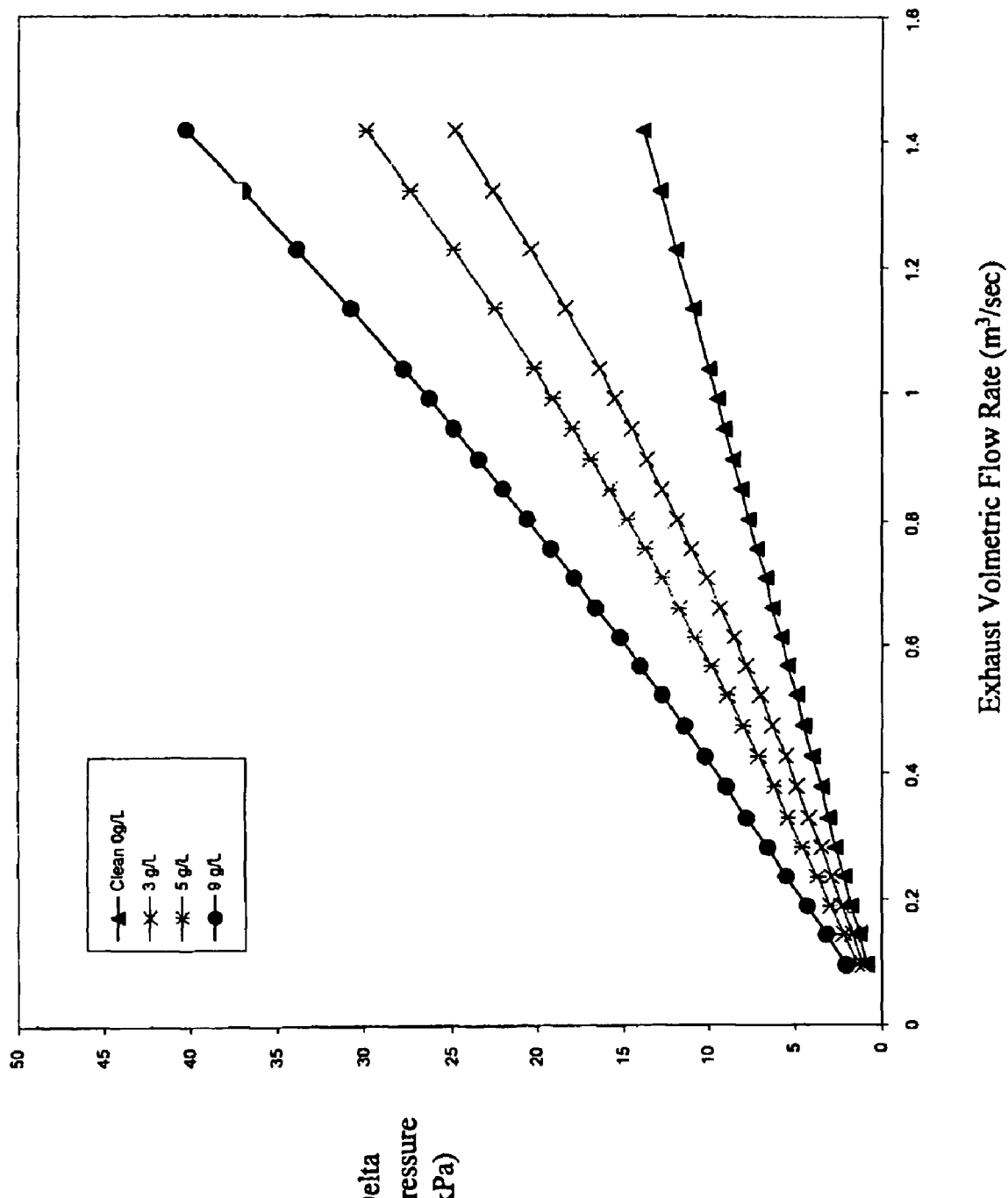
FIG. 1 shows the characteristic curves of delta pressure versus volumetric flow in a DPF.

FIG. 1 shows a graph of characteristic curves that are generated from such a calibration and provides a representation of the measured delta pressures of the DPF with different soot loadings at specific volumetric flow rates of the exhaust gas. In particular, the curve with the circular marks represents DPF soot loading of 9 g/L, the curve with asterisks represents DPF soot loading of 5 g/L, and the curve with the cross marks represents DPF soot loading of 3 g/L. The curve with the triangular marks represents DPF soot loading of 0 g/L, and is used as a baseline for flow resistance in a clean DPF. These curves are then used as a reference point to estimate soot loading in the DPF, for example, after extended operation by comparing data generated from subsequent measurements of delta pressures at specified flow rates.

In order to measure a clean filter flow resistance after certain duration of use, the DPF must be cleaned to remove the accumulated soot. The disclosed method involves cleaning the DPF, for example, by using a diesel oxidation catalysts that is provided upstream of the DPF so that one or more predetermined criteria are met. It is to be realized that the process used to clean the DPF so as to remove soot is not particularly limited, and may involve different cleaning systems with different configurations.

The parameters for the predetermined criteria are not particularly limited, and include duration of cleaning, flow rate during cleaning and DPF inlet temperature during cleaning. The predetermined criteria are used as standards that must be met before the delta pressure based soot load estimate is measured.

In one implementation, the predetermined criteria are met if the following are satisfied: (1) a percentage of time during the cleaning period in which the DPF inlet temperature meets a targeted temperature is above a predefined threshold and (2) a percentage of time during the cleaning period in which the DPF volumetric flow rate meets the requested flow rate is above a predefined threshold.

If at the end of a cleaning process, all of the predetermined criteria are not met, the cleaning is extended to make sure most of the soot is removed from the filter. If, on the other hand, all of the predetermined criteria are met, the delta pressure is measured at specified flow rates to obtain a soot load estimate.

In some instances, the delta pressure based soot load estimate may not indicate a zero-soot level. Without being bound to theory, one possible reason is explained as follows.

As mentioned previously, the characteristic curves are generated by calibrating fresh parts with very little contamination. However, in actuality, the DPFs used may be different from those that were used to generate the above curves. Since there are significant variations in flow resistance between filters, it is expected that the clean filter flow resistance of DPFs used to generate the above curves would not be the same as that of the replacement DPFs.

Moreover, DPFs that have been exposed to exhaust after extended periods accumulate particulate matter other than soot, such as ash, that remain in the filter even after the cleaning process mentioned above. Such particulate matter other than soot may cause skewing when measuring the delta pressure based soot load estimate after the cleaning process.

To account for such skewing, the disclosed method compares the delta pressure based soot load estimate measured after cleaning where all of the predetermined criteria are met, with the baseline of the calibration. The difference between the two is then calculated to generate a disparate value. The disparate value is used to adjust for delta pressure based soot load estimates obtained in subsequent measurements by adjusting the baseline for flow resistance in the clean DPF based on the disparate value.

When a subsequent measurement is made, the subsequently obtained delta pressure based soot load estimate can be compared with the previous measurement. The difference between the subsequently measured value and the previously measured value then can be used to adjust for measurements made afterwards by adjusting the already adjusted baseline. The number of times the subsequent measurements can be made, compared with the previous measurements and used for adjustments is not particularly limited.

Experimental Verification

Figure 2:
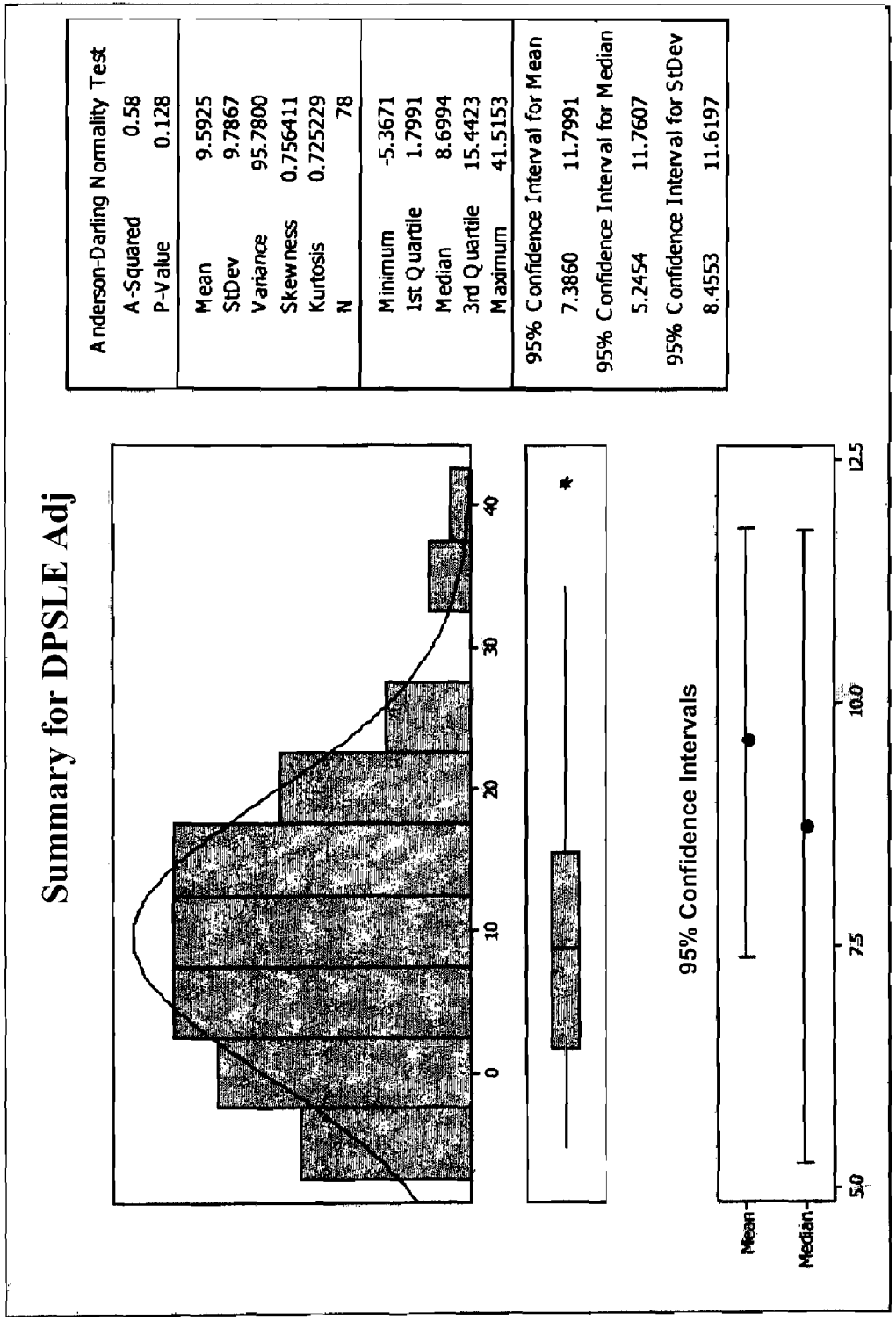
FIG. 2 shows the unadjusted delta pressure based soot load estimate data from an exemplary sample.

FIG. 2 shows one example of a data set of delta pressure based soot load estimates of DPFs from a fleet of field trucks after a cleaning that meets the abovementioned predetermined criteria. In this data set, the sample size is 78, the mean value is 9.5925 and the standard deviation is 9.7867. FIG. 2 also shows the results of an Anderson-Darling test. The calculated $A^2$ value is quite small at 0.58 and the corresponding p-value is very large at 0.128.

Figure 3:
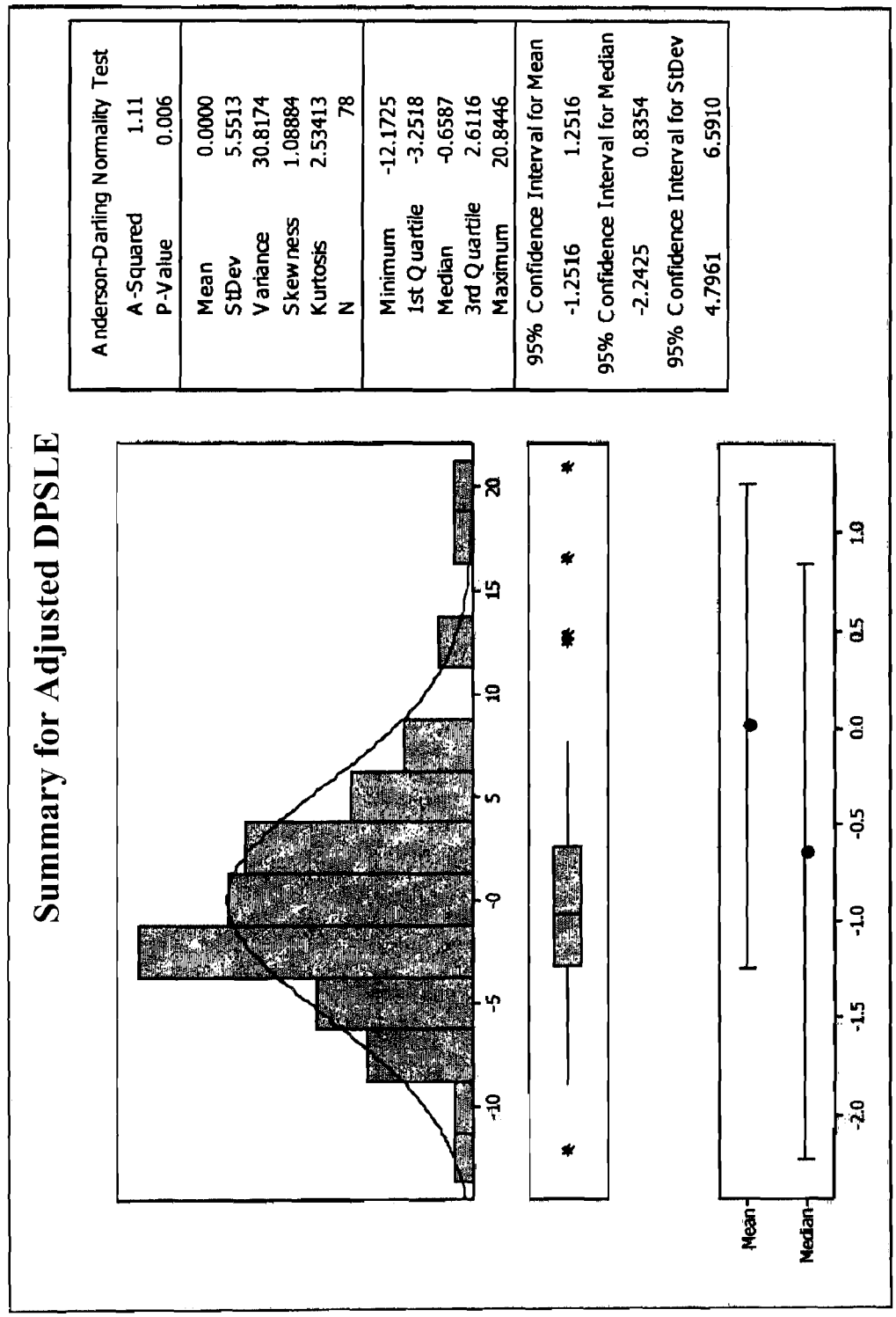
FIG. 3 shows the adjusted delta pressure based soot load estimate based on clean filter flow resistance measurement after cleaning of a filter involving predetermined criteria.

FIG. 3 shows the normalized adjusted values of the above data set based on the difference between the clean filter flow resistance measurement after the cleaning process and the baseline of the calibration. In this example, the mean value of 9.5925 is adjusted to zero, so that the standard deviation becomes 5.5513. Here, the calculated $A^2$ value is quite large at 1.11, and the p-value is very small. As such, the statistic indicates that the distribution is narrower and better centered.

In the above example, the mean value of 9.7867 is used as the disparate value. This mean value can be used in adjusting the subsequently obtained delta pressure based soot load estimate after another cleaning that meets the predetermined criteria. It is to be realized that the mathematical calculations for adjusting subsequent measurements to account for the offsets are not particularly limited, and may be obtained by subtracting the difference, multiplying by a constant, etc.

In another embodiment, the disclosed method involves diagnosing a filter after cleaning to meet certain standards, for example, manufacturer-defined criteria. The method includes comparing the particulate matter loading after the cleaning with a predefined threshold to further diagnose the effectiveness of the cleaning. In one mode of operation, a DPF can be diagnosed for On-Board Diagnostics (OBD) compliance monitoring. In order to be meet requirements for OBD compliance monitoring, a monitor needs to be designed so that a failure of soot removal from the DPF can be detected under conditions where the soot is expected to be removed. In this mode of operation, soot removal from the DPF involves regenerating the DPF by converting the trapped soot to carbon dioxide in the presence of heat.

Figure 4:
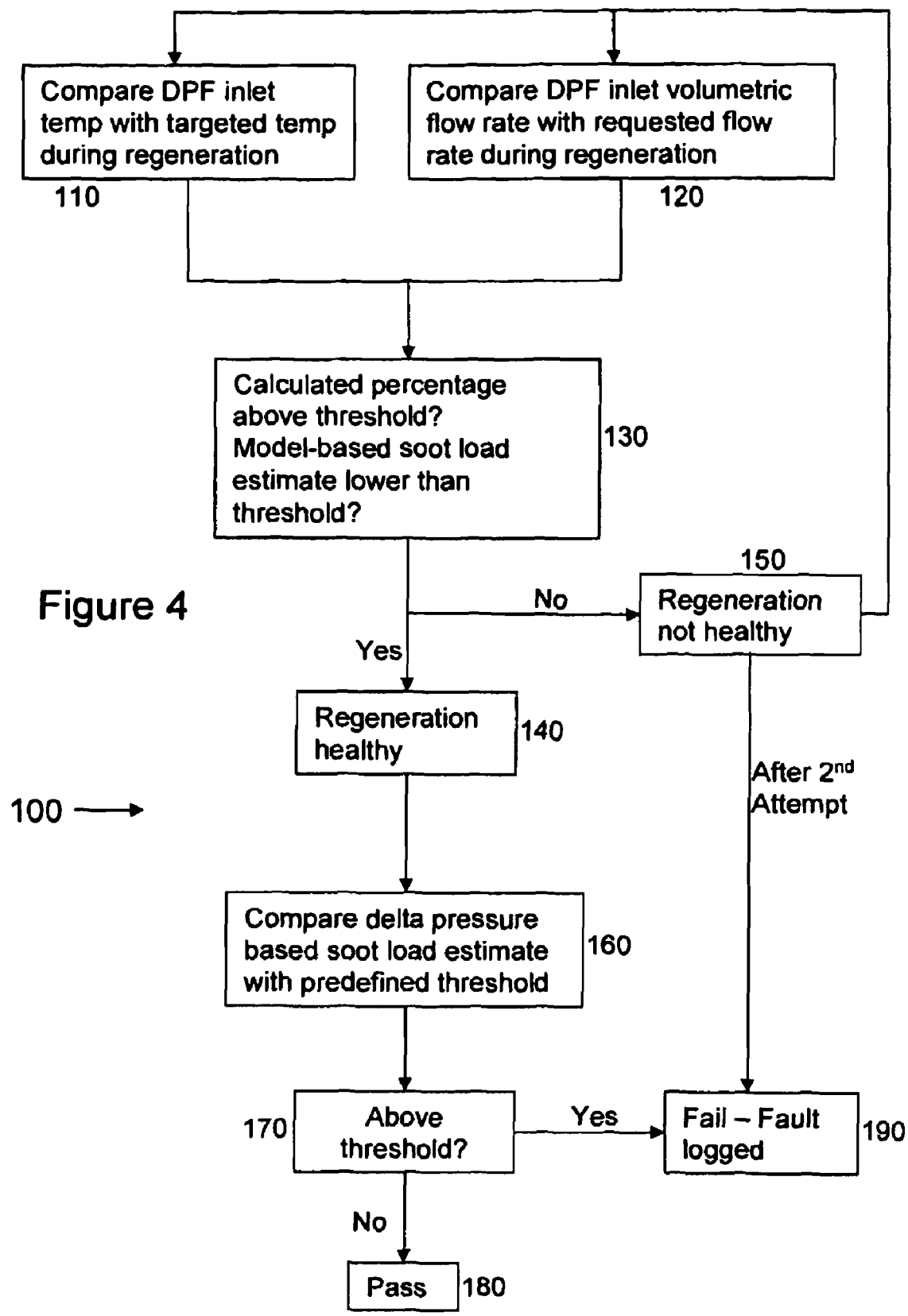
FIG. 4 shows one embodiment of the disclosed method.

In one implementation, the method of diagnosing for OBD compliance involves checking the effectiveness of a regeneration by monitoring the parameters of predetermined criteria. FIG. 4 illustrates one example 100 of the steps involved in this method.

As shown in FIG. 4, the method 100 involves comparing over a time period of an active regeneration, a DPF inlet temperature with a targeted temperature 110 and comparing over a time period of an active regeneration, a DPF inlet volumetric flow rate with a requested flow rate 120. Then, based on the comparisons 10 and 120, a calculation is made as to the percentage of time during the regeneration period in which (1) the DPF inlet temperature meets the targeted temperature and (2) the DPF volumetric flow rate meets the requested flow rate. A determination is then made as to whether the predetermined criteria are met 130.

The predetermined criteria are met if the calculated percentages are above a predefined threshold and the model-based soot load estimates are lower than a predefined threshold before the end of a regeneration period. If the predetermined criteria are met, then the regeneration is determined to be healthy 140. Otherwise, the regeneration is determined to be not healthy 150, and the diagnostic is aborted.

In the instance where the diagnostic is aborted, the above steps 110, 120, 130 are repeated during a subsequent regeneration. If the regeneration is determined to be not healthy after the second attempt, a fault would be logged 190. [inventors—please let us know whether this is correct]

Once the regeneration is determined to be healthy, the delta pressure based soot load estimate over the regeneration period is compared 160 and analyzed 170. If the delta pressure based soot load estimate is below a predefined threshold, then the diagnostic passes 180. On the other hand, if the delta pressure based soot load estimate is above the predefined threshold, then the diagnostic fails, and a fault is logged 190.

Figure 5:
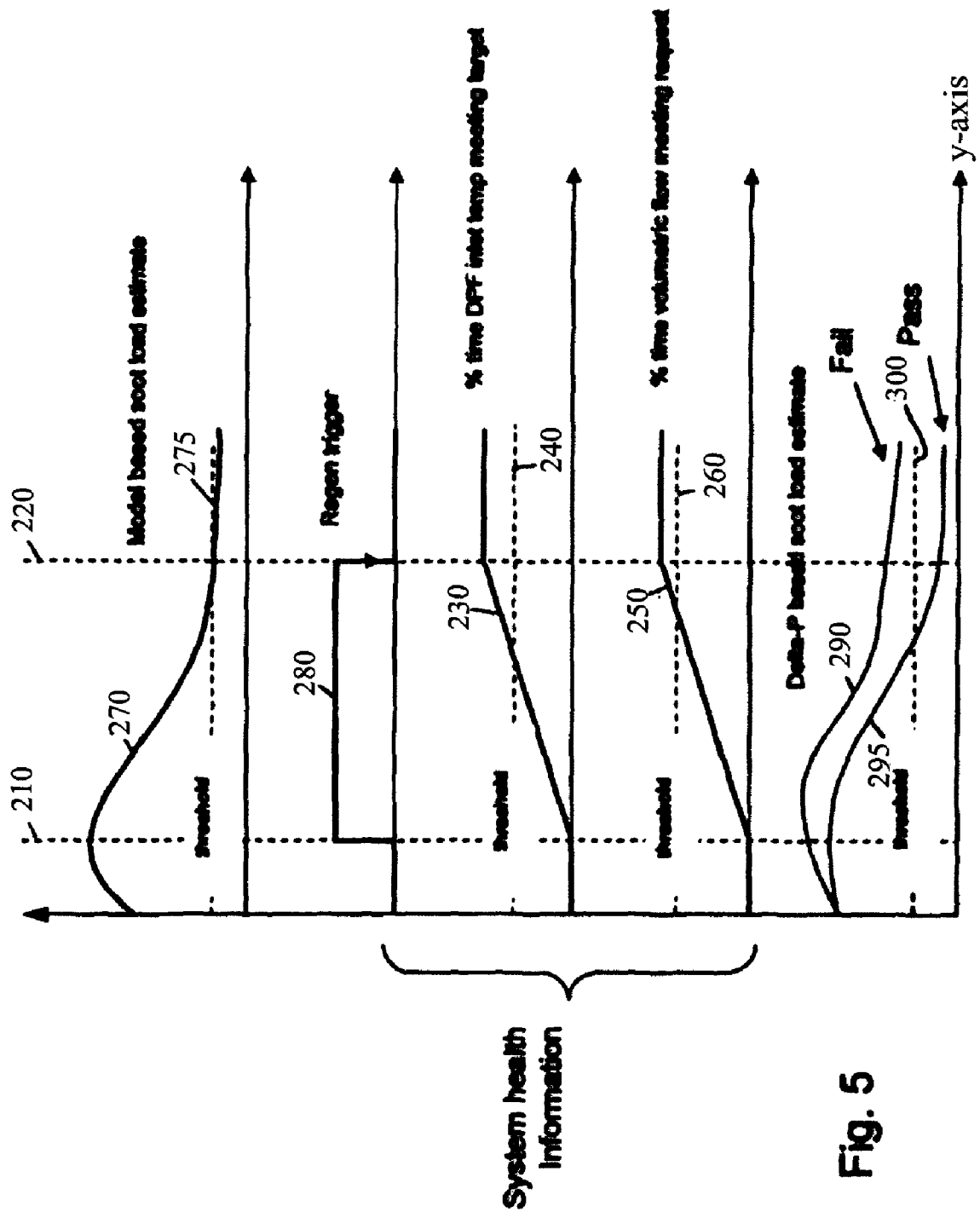
FIG. 5 shows an exemplary representation of values that can be obtained from a diagnostic of a filter over time.

FIG. 5 shows an exemplary representation of values that can be obtained from a diagnostic of a DPF over time, the time being represented by the y-axis. From top to bottom, FIG. 5 shows: (1) a plotted curve 270 of model-based soot load estimates, where in this portion of the graph, the vertical axis represents the model-based soot load estimates, (2) a regeneration trigger 280, where in this portion of the graph, a positive value on the vertical axis indicates active regeneration and a zero value on the vertical axis represents inactive regeneration, (3) a plotted line 230 of calculated percentage of time in which the DPF inlet temperature meets the target, where in this portion of the graph, the vertical axis represents the percentages of time in which the DPF inlet temperature meets the target, (4) a plotted line 250 of calculated percentage of time in which the volumetric flow rate meets the requested flow rate, where in this portion of the graph, the vertical axis represents the percentage of time in which the volumetric flow rate meets the requested flow rate, and (5) plotted curves 290, 295 of measured delta pressure based soot load estimates, where in this portion of the graph, the vertical axis represents the delta pressure based soot load estimates. Vertical dotted lines 210 and 220 indicate reference positions on the y-axis as to a starting time of active regeneration and an ending time of active regeneration, respectively.

FIG. 5 shows (1) the plotted line 230 crossing above a threshold line 240 before the end of the regeneration period, (2) the plotted line 250 crossing above a threshold line 260 before the end of the regeneration period, and (3) the plotted curve 270 crossing below a threshold line 275 before the end of the regeneration period. The lines 230, 250 and the curve 270 are representative examples where the regeneration is determined to be healthy.

The plotted curve 295 in FIG. 5 shows one example of measured delta pressure based soot load estimates of a DPF that has undergone a healthy regeneration. The curve 295 crosses below a threshold line 300 before the end of regeneration, and thus is an example where a DPF passes the diagnostic for OBD compliance. On the other hand, the plotted curve 290, which shows another example of measured delta pressure based soot load estimates of a DPF that has undergone a healthy regeneration, stays above the threshold line 300 before the end of regeneration. Thus, the curve 290 is a representative example where a DPF fails the diagnostic for OBD compliance. As a result, a fault would be logged.

One of the many advantages of the disclosed method is that the method can detect failure modes of a filter due to high ash loading, plugged channels or melting. In addition, the disclosed method substantially increases the chances of determining whether a cleaning of a filter was effective. Moreover, the method helps maintain system performance by improving reliability and minimizing a sacrifice in fuel economy due to engine back pressure, thereby limiting service costs or warranty claims.

While the disclosed system and method have been described in conjunction with a preferred embodiment, it will be obvious to one skilled in the art that other objects and refinements of the disclosed system and method may be made within the purview and scope of the disclosure.

The disclosure, in its various aspects and disclosed forms, is well adapted to the attainment of the stated objects and advantages of others. The disclosed details are not to be taken as limitations on the claims.

What is claimed is:

1. A method of compensating for measurement inaccuracies in a filter, the method comprising:
    after a regeneration period of a regeneration on the filter,
        determining an estimate of removable particulate matter loading remaining in the filter after the period, wherein the regeneration on the filter is a procedure that is intended to eliminate removable particulate matter from the filter, wherein the regeneration is active during the regeneration period, and wherein the regeneration is active when the procedure that is intended to eliminate removable particulate matter from the filter is in operation; and
    determining a first disparate value by quantifying a difference between:
        (1) the estimated removable particulate matter loading remaining in the filter after the regeneration period; and
        (2) a reference value,
    wherein the regeneration on the filter is repeated until at least one predetermined criteria is met,
    wherein whether to repeat the regeneration is based on the predetermined criteria,
    wherein the determination of whether at least one predetermined criteria is net is made at an end of the regeneration period when the regeneration is inactive, and wherein the regeneration is inactive when the procedure that is intended to eliminate removable particulate matter from the filter is not in operation, the predetermined criteria being used to indicate when a sufficient amount of removable particulate matter has been eliminated,
    wherein the predetermined criteria is met when:
        (1) a percentage of time during a regeneration period in which a filter inlet temperature meets or exceeds a targeted temperature is above a predefined threshold; and
        (2) a percentage of time during the regeneration period in which a volumetric flow rate through the filter meets or exceeds a requested flow rate is above a predefined threshold.

2. The method of claim 1, wherein determining the estimate comprises
    applying inputs to a function of pressure drop across the filter and volumetric flow rate, the inputs including observed pressure drop across the filter and observed volumetric flow rate, and
    estimating the removable particulate matter loading remaining in the filter based on the reference value.

3. The method of claim 1, wherein the reference value is obtained by a calibration of a fresh filter having substantially no contaminants.

4. The method of claim 1, wherein the predetermined criteria comprise at least one of: a duration of the regeneration period, a volumetric flow rate of fluid through the filter, or a temperature of an inlet of a filter during the regeneration period.

5. The method of claim 1. further comprising adjusting the reference value based on the disparate value so as to generate a first adjusted reference value.

6. The method of claim 5, further comprising:
    conducting a subsequent regeneration of the filter;
    determining an estimate of removable particulate matter loading remaining, in the filter after the subsequent regeneration;
    determining a second disparate value by quantifying a difference between:
        (1) the estimated removable particulate matter loading remaining in the filter after the subsequent regeneration; and
        (2) the first adjusted reference value; and
    adjusting the first adjusted measured value based on the second disparate value so as to generate a second adjusted reference value.

7. The method of claim 6, wherein determining the estimate of the removable particulate matter loading remaining in the filter comprises
applying, inputs to a function of pressure drop across the filter and volumetric flow rate, the inputs including observed pressure drop across the filter and observed volumetric flow rate, and
estimating the removable particulate matter loading remaining in the filter based on first adjusted reference value.

8. The method of claim 1, wherein the filter is a diesel particulate filter, and the removable particulate matter is soot.

9. The method of claim 8, wherein determining the estimate comprises measuring a delta pressure based soot load estimate.

10. The method of claim 9 further comprising determining whether the measured delta pressure based soot load estimate is above it predefined threshold when predetermined conditions are met at an end of the regeneration period.

11. The method of claim 10, wherein a fault is logged when the delta pressure based soot load estimate is above the predefined threshold.

12. A method of diagnosing the healthiness of a regeneration of a diesel particulate filter, the method comprising:
(i) determining, over a time period of an active regeneration, an estimate of soot loading in the diesel particulate filter;
(ii) determining whether predetermined criteria for the healthiness of the regeneration are met over the time period of the active regeneration,
the regeneration being repeated at least one time if the predetermined criteria are not met, step (ii) being conducted at an end of the time period of the active regeneration, the regeneration being healthy when the predetermined criteria are met: and
(iii) when the regeneration is determined to be healthy, verifying that the regeneration is healthy by determining whether the estimated soot loading in the diesel particulate filter is above a predefined threshold at an end of the time period of the active regeneration,
wherein the predetermined criteria are met when:
(1) a percentage of time during the time period of the active regeneration in which the inlet temperature meets or exceeds the targeted inlet temperature is above a predefined threshold,
(2) a percentage of time during the time period of the active regeneration in which the volumetric, flow rate meets or exceeds the requested volumetric flow rate is above a predefined threshold, and
(3) a model-based soot load estimate is lower than a predefined threshold at the end of the time period of the active regeneration.

13. A method of compensating for measurement inaccuracies in a filter, the method comprising:
after a cleaning procedure on the filter that is intended to eliminate removable particulate matter from the filter, determining an estimate of removable particulate matter loading remaining in the filter after the cleaning procedure; and
determining a first disparate value by quantifying a difference between:
(1) the estimated removable particulate matter loading remaining in the filter after the cleaning procedure; and
(2) a reference value,
wherein the cleaning procedure on the filter is continued until at least one predetermined criteria is met, the predetermined criteria being used to indicate when a sufficient amount of removable particulate matter has been eliminated,
wherein the predetermined criteria is met when:
(1) a percentage of time during a cleaning period in which a filter inlet temperature meets or exceeds a targeted temperature is above a predefined threshold; and
(2) a percentage of time during the cleaning period in which a volumetric flow rate through the filter meets or exceeds a requested flow rate is above a predefined threshold.

14. A method of diagnosing the healthiness of a regeneration of a diesel particulate filter, the method comprising:
determining, over a time period of an active regeneration, an estimate of soot loading in the diesel particulate filter;
determining whether predetermined criteria for the healthiness of the regeneration are met over the time period of the active regeneration, the regeneration being healthy when the predetermined criteria are met; and
when the regeneration is determined to be healthy, verifying that the regeneration is healthy by determining whether the estimated soot loading in the diesel particulate filter is above a predefined threshold at an end of the time period of the active regeneration,
wherein the predetermined criteria are met when:
(1) a percentage of time during the time period of the active regeneration in which the inlet temperature meets or exceeds the targeted inlet temperature is above a predefined threshold,
(2) a percentage of time during the time period of the active regeneration in which the volumetric flow rate meets or exceeds the requested volumetric flow rate is above a predefined threshold, and
(3) a model-based soot load estimate is lower than a predefined threshold at the end of the time period of the active regeneration.

15. A method of claim 14, wherein determining the estimate comprises
applying inputs to a function of delta pressure and volumetric flow rate, the inputs including observed delta pressure and observed volumetric flow rate, and
estimating the soot loading based on a calibration of a fresh diesel particulate filter having substantially no contaminants.

16. The method of claim 14, further comprising logging a fault when the estimated soot loading in the diesel particulate filter is above the predefined threshold at the end of the time period of the active regeneration.

* * * * *